HIGH-POWER HIGH-FREQUENCY ELECTRON DISCHARGE APPARATUS

Original Filed Feb. 3, 1943 2 SHEETS—SHEET 1

INVENTOR
RUSSELL H. VARIAN
BY Herbert H. Thompson
ATTORNEY.

HIGH-POWER HIGH-FREQUENCY ELECTRON DISCHARGE APPARATUS
Original Filed Feb. 3, 1943 2 SHEETS--SHEET 2
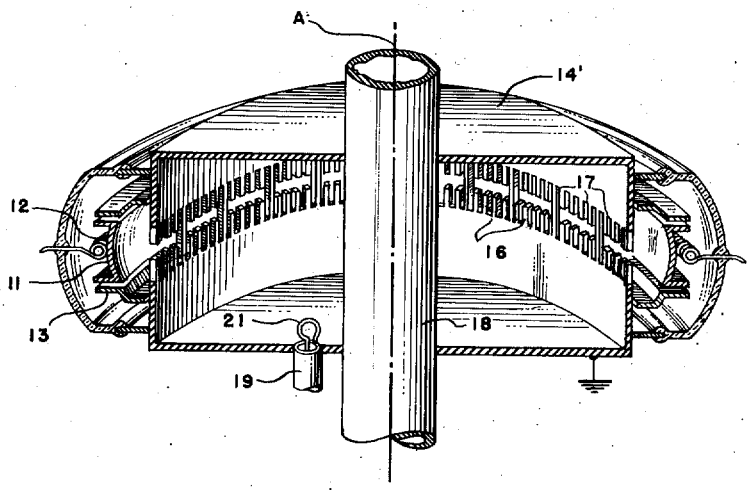
FIG. 1-A
INVENTOR
RUSSELL H. VARIAN
BY
Herbert H. Thompson
ATTORNEY.

Reissued Aug. 5, 1952

Re. 23,534

UNITED STATES PATENT OFFICE 23,534

HIGH-POWER HIGH-FREQUENCY ELECTRON DISCHARGE APPARATUS

Russell H. Varian, Stanford Village, Calif., assignor to The Sperry Corporation, a corporation of Delaware Original No. 2,466,063, dated April 5, 1949, Serial No. 474,621, February 3, 1943. Application for reissue March 14, 1950, Serial No. 149,621

15 Claims. (Cl. 315—39)

Matter enclosed in heavy brackets [ ] appears in the original patent but forms no part of this reissue specification; matter printed in italics indicates the additions made by reissue.

The present invention relates, generally, to ultra-high frequency apparatus for the production of high power output at very high frequencies, and, more particularly, to high frequency apparatus of the type disclosed in Patent No. 2,269,456, for "Electron beam oscillator," issued January 13, 1942, to William W. Hansen and Russell H. Varian.

In the above-mentioned patent there is disclosed an ultra-high frequency electron discharge device of the velocity modulation type using a single resonating chamber, which device is adapted to operate as an ultra-high frequency oscillator, or in many other ways. Single resonator devices of this type have been termed "Monotrons."

In copending application Serial No. 420,769, for "High frequency electron discharge apparatus," filed November 28, 1941, in the name of William W. Hansen, which issued January 8, 1946, as Patent No. 2,392,379, there is shown an improved form of such a "Monotron" in which the cross-section of the axially symmetric resonator is increased in the direction of electron flow in accordance with the relationship which has been found by calculation to provide improved output. The present invention is more particularly directed toward obtaining higher power outputs from Monotron devices of the type shown in the above-mentioned Patents No. 2,269,456 and No. 2,392,379.

It is well-known, in such devices utilizing hollow cavity resonators, that the operating frequency is dependent upon the dimensions of the resonator. For this reason, where high frequencies are desired it has been necessary to use relatively small resonators, which, in turn, limit the amount of power which can be derived from the resonator. I have discovered that, if a new resonator is formed enclosing a figure-of-revolution space formed by rotating the cross-sectional outline of the resonator of either of the previous applications about an axis at an angle to, and preferably either parallel or perpendicular to the axis of symmetry of the original resonator and outside this original resonator, such an enlarged resonator will have a resonant frequency, in some cases, not greatly different from that of the original resonator. In all cases the surface of the resonator thereby produced is greatly increased, which permits the use of much larger electron beam currents whereby increased power output may be derived from the device.

Accordingly, it is an object of the present invention to provide an improved Monotron-type electron discharge device adapted to operate with increased power output.

It is a further object of the present invention to provide an improved Monotron-type electron discharge device in which the resonator thereof is formed as a surface of revolution obtained by rotating a "Monotron" resonator about an axis parallel or perpendicular to its axis of symmetry.

Other objects and advantages will become apparent from the following specification and drawing in which Fig. 1 shows a perspective cross-sectional view of one form of the present invention having a radially inwardly directed electron beam.

*Fig. 1-A is a perspective cross-sectional view of a version of the invention with straight end plates, and with a radially inwardly directed beam.*

Figure 1:
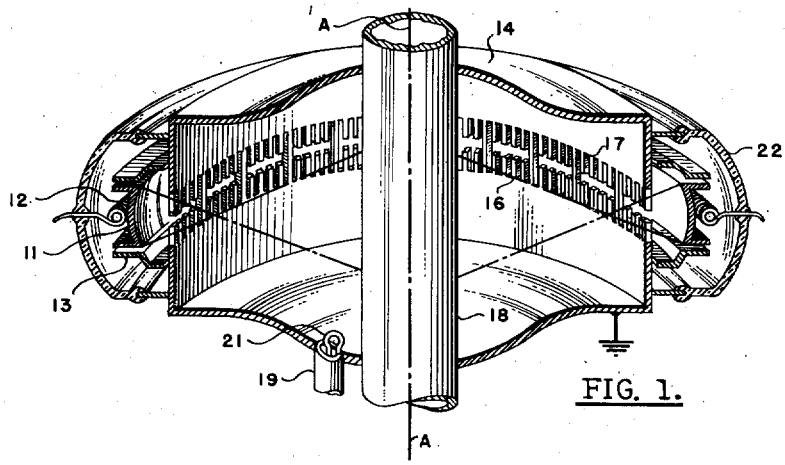

Referring now to Fig. 1, there is shown a Monotron device having an annular thermionic cathode 11, which may preferably be made concave inward, in order to provide a focusing action for the electrons emitted therefrom, which assists in preventing spread of the beam due to its internal space charge. Cathode 11 is heated by a suitable heater or filament 12, energized from a source of electrical energy (not shown). Closely adjacent to cathode 11 is a cathode shield or grid 13 having radially-directed ends. Shield 13 may be maintained at a suitable relatively low potential with respect to cathode 11, whereby it assists in focusing the electron stream radially inward.

The device of Fig. 1 also includes a resonator 14, which is formed as a figure-of-revolution about an axis A—A.

The radial cross-section of resonator 14 is formed to meet essentially the same requirements as described in Patent No. 2,392,379; that is, the resonator is formed to provide a relatively weak field strength near the electron stream entrance point and a relatively strong field at the stream exit point, so that high frequency oscillations are produced, as described in the above-mentioned patent and application.

The radial disposition of the resonator 14 of Fig. 1 tends to produce a weaker field at the radially outer portions and a stronger field at the radially inner portions. Since this is one of the requirements for successful operation of the tube of Fig. 1, the flare of the upper and lower members may be decreased with respect to that of the corresponding resonator of Patent No. 2,392,379, and may even be made straight.

*Such a version with straight end members or plates is illustrated in Fig. 1–A.*

Resonator 14 is also provided with an annular grid 16 disposed opposite cathode 11. Grid 16 may be of any suitable form adapted to permit passage of electrons therethrough while maintaining suitable energy inter-coupling relationship between resonator 14 and the electron beam. In the present illustration grid 16 is shown as formed of axially extending, cylindrically disposed, spaced linear elements 17, some of which extend completely across the opening containing the grid 16 to enhance the mechanical rigidity of the structure and others of which extend only partially across this opening leaving a free opening for passage of the electrons. It is to be understood that any other suitable form of grid may be utilized here, or the opening may be entirely gridless, being thus formed as an equatorial slit.

Along the axis of the resonator 14 is provided an electron collector 18 which, in the present case, is shown as merely a hollow cylindrical conducting tube. Suitable cooling fluid may be circulated within tube 18 to remove the heat generated therein by the impact of electrons collected thereby. Also, suitable radially extending fins may be added for the purpose of preventing secondary electron emission, in any well-known manner.

As is taught in Patent No. 2,392,379, the radial dimension of resonator 14 and the curve of its upper and lower flaring members are suitably chosen with relation to the potential impressed between cathode 11 and the resonator 14, so that high frequency oscillations are generated therein. High frequency energy may thereupon be abstracted from the resonant cavity 14 by means of a suitable energy coupling comprising a concentric line 19 and a coupling loop 21. To complete the evacuated envelope of the device, an annular insulating, preferably vitreous, member 22 is provided which encloses cathode 11, filament 12 and shield 13, the potential supply leads for the various electrodes then passing through envelope 22 with suitable sealing precautions.

In this manner a high frequency device is provided having large resonator and cathode surface areas, whereby large electron beam currents may be utilized, providing increased high power output at very high frequencies.

Figure 2:
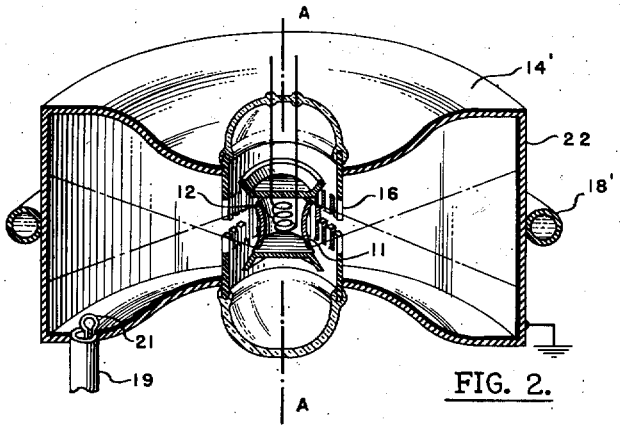
Fig. 2 shows a perspective cross-sectional view of a modified form of the invention of Fig. 1, having a radially outwardly directed electron beam.

Fig. 2 shows a modification of the device of Fig. 1 in which the electron beam is shown as proceeding radially outward instead of radially inward, as in Fig. 1. The resonator 14' is again a figure-of-revolution about axis A—A, but having its larger axial dimension at its radially outward portions instead of the reverse, as in Fig. 1.

Cathode 11 and filament 12 are now disposed centrally of the resonator 14', and the electron beam is directed outwardly to the grid 16 by means of a suitable battery or potential source (not shown) connected therebetween, so that oscillations are produced in resonator 14' in the same manner as in Fig. 1. Suitable cooling coils 18' may be utilized in this case also to abstract heat from the outer cylindrical wall 22 of resonator 14' upon which the electrons impinge.

In this device, the radially symmetric arrangement tends to produce a field which is weaker at the electron stream exit or terminal point than at its entrance point. Accordingly, increased flare of the upper and lower members must be used to provide the desired relative field strengths at these entrance and exit points, in comparison to the tube of Fig. 1.

The operation of the device of Fig. 2 is similar to that of Fig. 1 and produces the same advantages. In the case of the device of Fig. 1, it will be seen that a large cathode area is provided, whereas a relatively small electron collecting area is also inherent in the device. Such a small collecting area forms a disadvantage and in some cases may be a limiting factor with respect to the power to be derived from the device. In the device of Fig. 2, on the other hand, the cathode area is reduced, while the electron collecting area is increased. Depending upon the electron energy and the potential applied between cathode 11 and the resonator 14, one or the other of the devices of Figs. 1 or 2 may be the more advisable.

Figure 3:
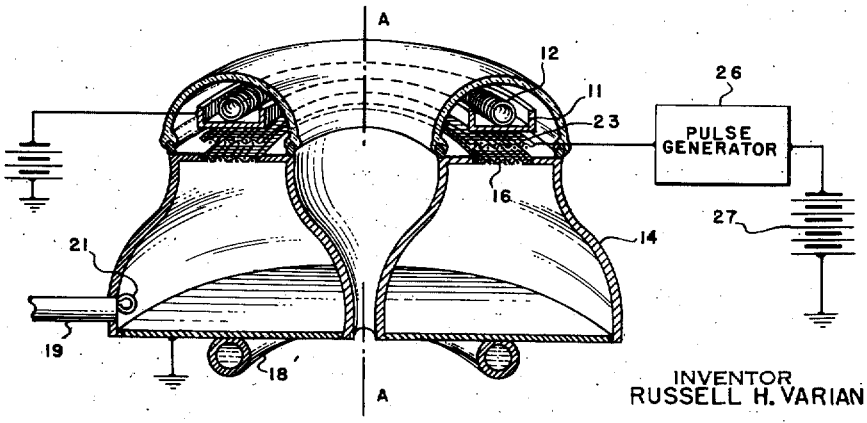
Fig. 3 shows a perspective cross-sectional view of a further form of the invention having an annular axially directed electron beam.

The device of Fig. 3 shows a further form of the high frequency device of the invention, in which the resonator 14 is formed as a figure-of-revolution about axis A—A, which is parallel to the direction of electron flow. In this case the electron beam is formed in an annular arrangement instead of a radial arrangement, as in the preceding figures. This form of the invention has the advantage over the preceding forms in that both the cathode area and the collecting area are relatively large and neither forms a limiting factor for the other.

Although in Figs. 1–3 the axis of symmetry of the figure-of-revolution resonators is shown as either parallel to or perpendicular to the direction of the electron stream, it is to be understood that other inclinations may be used, which may be selected to provide any desired relation between cathode area and collector area.

If desired, an extra grid, such as 23, may be added in any of the figures between cathode 11 and the entrance grid 16 of resonator 14, and suitable potentials may be applied to grid 23, as from a pulse generator 26 and battery 27 in a manner described in the above-mentioned Patent No. 2,269,456. The remainder of the device of Fig. 3 is similar to those of Figs. 1 and 2.

In each of the resonators shown in Figs. 1 to 3, the resonator dimension perpendicular to the electron stream flow varies monotonically along the entire length of the stream; that is, this dimension varies smoothly without changing sense of variation. Thus, this dimension continually increases or is constant along the direction of electron flow, but does not increase over one portion of the resonator and decrease over another portion.

Accordingly, I have described an improved form of Monotron device in which greatly increased power outputs may be derived in comparison to the preceding forms.

As many changes could be made in the above construction and many apparently widely different embodiments of this invention could be made without departing from the scope thereof. it is intended that all matter contained in the above description or shown in the accompanying drawing shall be interpreted as illustrative and not in a limiting sense.

What is claimed is:

1. High power ultra-high frequency apparatus comprising conductive means defining a hollow cavity resonator having the form of a figure-of-revolution about an axis external to said resonator and adapted to contain standing electromagnetic waves resonant therein, the axial dimension of said resonator varying with radial distance from said axis whereby said resonator will sustain oscillation therein with an electric field at one radial extremity of said resonator of weaker intensity than the intensity of said field at the other radial extremity of said resonator, and means concentric with said axis and adjacent the narrow end of said resonator for projecting an electron stream radially through said cavity from said weaker field toward said stronger field for producing and sustaining oscillations therein.

2. High power ultra-high frequency apparatus as in claim 1 wherein said resonator has an axial dimension at the stream terminal point greater than its axial dimension at the stream entrance point.

3. High power ultra-high frequency apparatus as in claim 1 wherein said resonator has a monotonically increasing axial dimension along the direction of electron flow.

4. High power ultra-high frequency apparatus comprising conductive means defining a cavity resonator in the form of a figure-of-revolution formed by rotating a substantially closed figure about an axis exterior to said closed figure and adapted to contain standing electromagnetic waves resonant therein, said resonator having a cross-section containing said axis and having a continuously increasing linear dimension perpendicular to said axis, and means concentric with said axis and opposite the narrow end of said resonator for projecting an electron stream perpendicular to said dimension and parallel to said axis to set up oscillations in said resonator.

5. High power ultra-high frequency apparatus comprising conductive means defining a cavity resonator in the form of a figure-of-revolution formed by rotating a substantially closed figure about an axis exterior to said closed figure, and adapted to contain standing electromagnetic waves resonant therein, said resonator having a cross-section containing said axis and having a dimension perpendicular to said axis and of a continuously increasing magnitude, and means concentric with said axis and opposite the narrow end of said resonator for projecting an electron stream perpendicular to said dimension to set up oscillations in said resonator.

6. An electromagnetic oscillator for high power comprising a hollow member providing a cavity resonator having conducting inner wall surfaces adapted to contain a resonant oscillating electromagnetic field having a first region of relatively strong field intensity and a second region of relatively weak field intensity, said resonator having a frequency of oscillation determined by the dimensions of said resonator, and also having the form of a figure-of-revolution about an axis of symmetry external said resonator, means in alignment with said resonator adjacent sad weak field intensity region for projecting a stream of electrons substantially radially of said axis through said resonator from the weak field intensity region toward the strong field intensity region for establishing and maintaining said field.

7. An electromagnetic oscillator for high power comprising a hollow member providing a cavity resonator having conducting inner wall surfaces adapted to contain a resonant oscillating electromagnetic field, and having a frequency of oscillation determined by the dimensions of said resonator, said resonator being formed as a figure-of-revolution formed by rotating a substantially closed figure about an axis exterior said figure, closed path means concentric with said axis for projecting a substantially cylindrical stream of electrons through said resonator parallel and concentric with said axis for establishing and maintaining said field, the radial dimension of said resonator monotonically increasing in the direction of electron flow to render the electric field at the stream entrance point less intense than the field at the stream exit point.

8. A closed resonant circuit comprising a conducting hollow member providing a cavity resonator, said member being in the form of a figure-of-revolution about an axis of symmetry external of said resonator, the axial dimension of said resonator decreasing with increasing radial distances from said axis.

9. Ultra-high frequency apparatus comprising conductive means defining a cavity resonator in the form of a figure-of-revolution formed by rotating a substantially closed figure about an axis exterior said closed figure and adapted to contain standing electromagnetic waves resonant therein, means in said apparatus for projecting an electron stream into said cavity resonator means, said cavity resonator having a width which is an increasing function of the length of the path of said electron stream whereby a relatively weak electric field region at the electron stream entrance point.

10. Ultra-high frequency apparatus comprising conductive means defining a cavity resonator in the form of a figure-of-revolution formed by rotating a substantially closed figure about an axis exterior said closed figure and adapted to contain standing electromagnetic waves resonant therein, said resonator including an annular electron input opening; a cathode positioned adjacent said annular input opening and exterior said conductive means for projecting electrons through said opening into the annular volume enclosed by said conductive means for exciting standing waves to sustain oscillations therein, said resonator having a width which is an increasing function of the length of the path of said electrons whereby said annular volume has a relatively weak electric field region in vicinity of said input opening.

*11. An electrical discharge device comprising a chamber having conducting walls in the form of an outer cylinder having perforations in its wall and an unperforated inner cylinder interconnected at each end by electrically conducting material, an electron emissive source positioned adjacent to said perforations and insulated from said walls, and means included by said device for impressing an electric field in the region adjacent said source for projecting electrons from said source through said perforations into said chamber.*

*12. An electrical discharge device comprising a chamber having conducting walls in the form of an outer cylinder having perforations in its wall and an unperforated inner cylinder interconnected at each end by electrically conducting material, an electron emissive source, positioned adjacent to said perforations and insulated from said chamber, a vacuum-tight enclosure maintained at a high vacuum enclosing said cathode and said perforations, means included by said device for impressing an electric field in the region adjacent said source for projecting electrons from said source through said perforations into said chamber, and coupling means having a portion projecting within said chamber for transmitting energy resident in an electric field inside said chamber to a work circuit.*

*13. An electrical discharge device comprising a chamber having conductive walls in the form of an outer cylinder having perforations in its walls and an inner cylinder interconnected at each end by electrically conducting material, an electron emissive source positioned adjacent to said perforations and insulated from said chamber, means included by said device for impressing an electric field in the region adjacent said source for projecting electrons from said source through said perforations into said chamber, the radial distance between said inner and said outer cylinders being such that said electrons traverse it in a time equal to $n+\frac{1}{4}$ cycles of the fundamental mode of electrical vibration of said chamber where n is any integer.*

*14. An electrical discharge device comprising a chamber having conducting walls in the form of an outer cylinder having perforations in its walls and an inner cylinder interconnected at each end by plates of electrically conducting material, an electron emissive source positioned adjacent to said perforations and insulated from said chamber, means included by said device for impressing an electric field in the region adjacent said source for projecting electrons from said source through said perforations into said chamber, said electrons passing through said perforations with a velocity which is substantially*

$$\frac{a}{(n+\frac{1}{4})\frac{2L}{C}}$$

*where a is the radial distance from the inner of said cylinders to the outer of said cylinders, L is the distance between said plates, C is the velocity of light, and n is any integer.*

*15. An electrical discharge device comprising a chamber having conducting walls in the form of an outer cylinder having a perforated area in its wall and an inner cylinder interconnected at each end by plates of electrically conducting material, said area subtending a major portion of the circumference of said outer cylinder, a linearly extending electron emitter subtending said perforated area, means included by said device for impressing an electric field in the region adjacent said source for causing electrons from said source to be projected through said perforations into said chamber, and means coupled to a member projecting into said chamber for utilizing the energy of electrical oscillations produced within said chamber, said electrons passing through said perforations with a velocity which is equal to*

$$\frac{a}{(n+\frac{1}{4})\frac{2L}{C}}$$

*where a is the radial distance from the inner of said cylinders to the outer of said cylinders, L is the distance between said plates, C is the velocity of light, and n is any integer.*

RUSSELL H. VARIAN.

REFERENCES CITED

The following references are of record in the file of this patent or the original patent:

UNITED STATES PATENTS

| Number | Name | Date |
|---|---|---|
| 2,190,668 | Llewellyn | Feb. 20, 1940 |
| 2,253,080 | Maslov | Aug. 19, 1941 |
| 2,259,690 | Hansen et al. | Oct. 21, 1941 |
| 2,269,456 | Hansen et al. | Jan. 13, 1942 |
| 2,289,846 | Litton | July 14, 1942 |
| 2,298,949 | Litton | Oct. 13, 1942 |
| 2,306,860 | Black | Dec. 29, 1942 |
| 2,314,794 | Linder | Mar. 23, 1943 |
| 2,342,789 | Cassen | Feb. 29, 1944 |
| 2,392,379 | Hansen | Jan. 8, 1946 |